J. E. STEVENS AND W. THACKERAY, Jr.
BLIND PLOWING ATTACHMENT FOR PLANTERS.
APPLICATION FILED JUNE 7, 1918.
1,303,222.
Patented May 6, 1919.
2 SHEETS—SHEET 1.
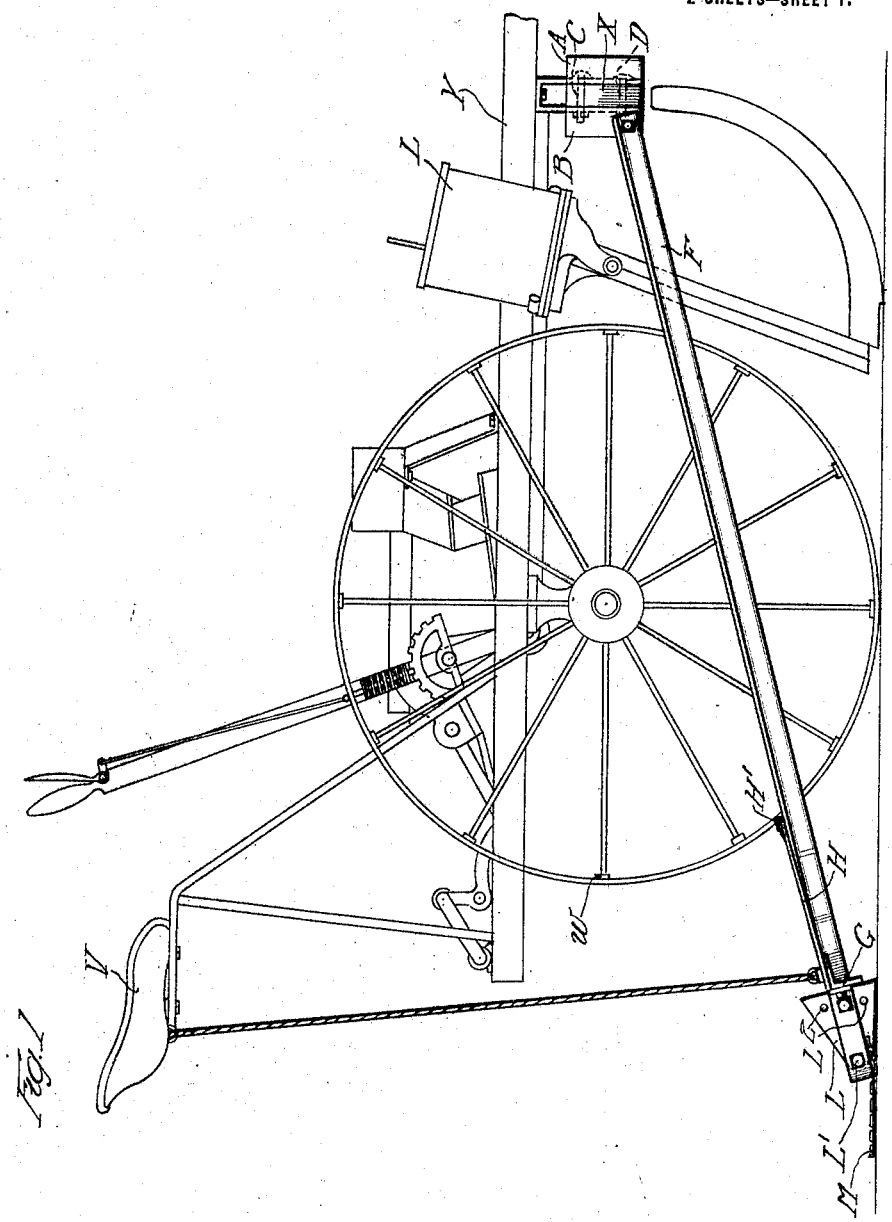

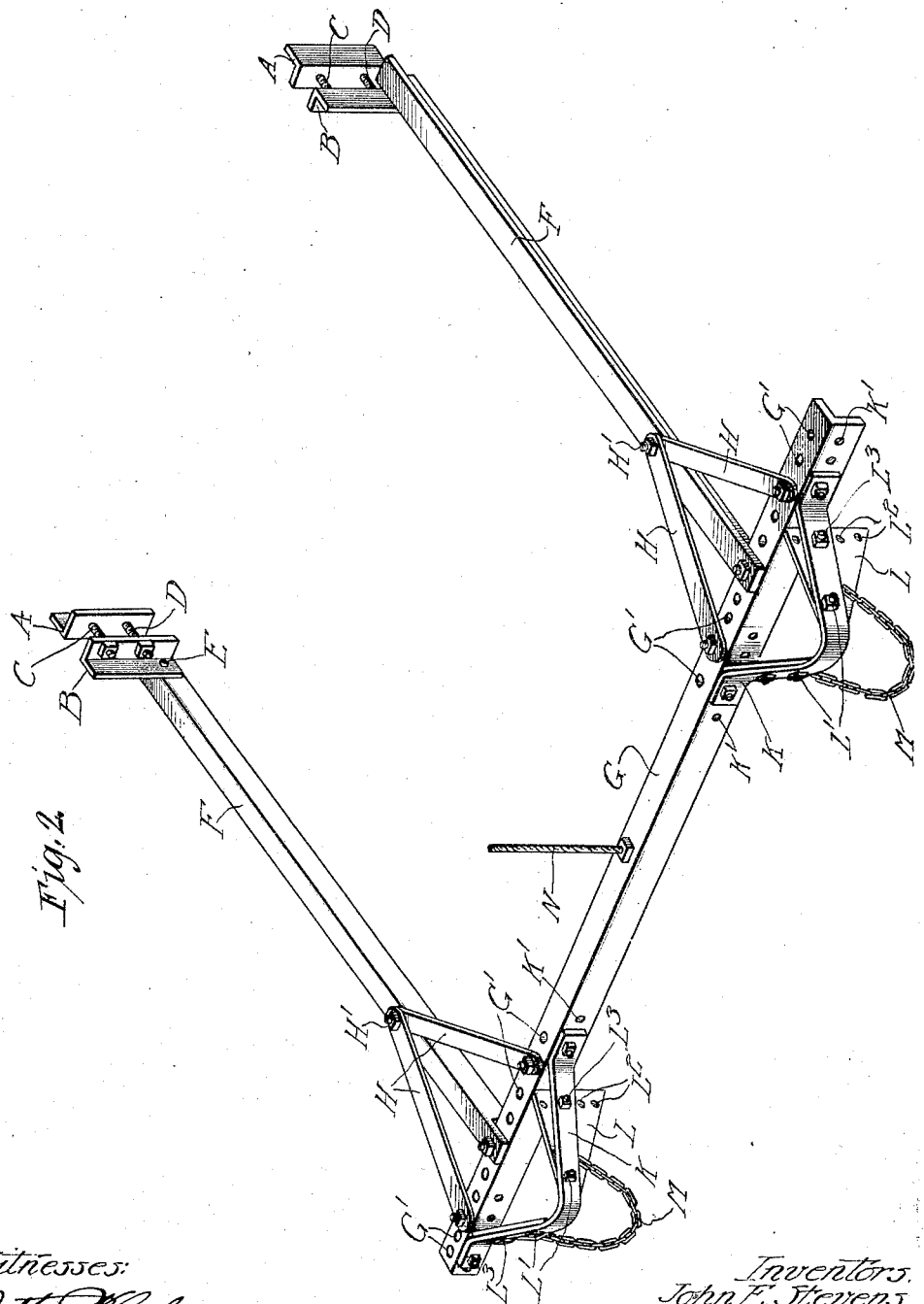

UNITED STATES PATENT OFFICE.

JOHN E. STEVENS AND WILLIAM THACKERAY, JR., OF KEWANEE, ILLINOIS.

BLIND-PLOWING ATTACHMENT FOR PLANTERS.

1,303,222.         Specification of Letters Patent.         Patented May 6, 1919.

Application filed June 7, 1918. Serial No. 238,710.

*To all whom it may concern:*

Be it known that we, JOHN E. STEVENS and WILLIAM THACKERAY, Jr., citizens of the United States, and residents of the city of Kewanee, in the county of Henry and State of Illinois, have invented certain new and useful Improvements in Blind-Plowing Attachments for Planters, of which the following is a specification.

Our present invention relates to a blind plowing attachment for planters and has for its objects the provision of an attachment which may be readily assembled with any of the commercial planters obtainable upon the market, and when so assembled will follow the wheels which usually run over the place where the seeds have been deposited in the ground for the purpose of firming the ground around the seed, and comminutes and piles up a ridge of pulverized earth directly over the ground in which the seed has been firmed. This will discourage weed growth and, most important of all, the pulverized ground prevents the drying out and caking of the earth immediately around the seed.

As will be hereafter seen, our attachment is extremely simple in construction, but nevertheless comprises facilities for a large range of adjustments to fit planters of different width frames and tracks. Simple adjustments are also provided so that a greater or less ridge of earth will be made according to the requirements of the particular soil that is being operated upon, and, also, the attachment may easily be lifted entirely free from the earth without detaching the same from the planter.

We attain the above objects in the manner illustrated in the accompanying drawing in which Figure 1 illustrates a seed planter and our attachment mounted thereon in side elevation. Fig. 2 is a detailed view of our attachment.

Our attachment may be conveniently attached to one of the cross pieces X of the bed or frame Y of the planter, on which the seed hoppers Z are carried, by means of clamps, each comprising suitable lengths of L-section iron, A and B, bored and clamped respectively upon the front and rear sides of the cross piece X of the planter bed by bolts, C and D. To the lower portions of the rearwardly extending flanges of the rearwardly positioned lengths of L-sections, B, are pivoted, by means of bolts, E, rearwardly extending side bars, F, which extend just outside and to the rear of the wheels W of the planter.

To the rear ends of the bars, F, is bolted a transverse bar, G, also made preferably of a length of L-section metal. The forwardly extending horizontal flange of the transverse bar, G, is preferably provided with a number of bolt holes, G', for the attachment of the bars, F, so that the spread of the bars may be adapted to the particular planter with which the attachment is assembled. Also to prevent the attachment frame from pivoting at the points of attachment of the longitudinal bars, F, with the transverse bar, G, we provide for each longitudinal bar two brace bars, H, the forward ends of which are bolted to the longitudinal bar with a single bolt, H', and the rear ends of which are spread upon each side of the longitudinal bar and bolted to the transverse bar in the holes, G', heretofore referred to.

To the vertically disposed flange of the transverse bar, G, and so as to extend rearwardly, are bolted substantially V or U- shaped brackets or loops, K, of band metal of suitable thickness, a number of holes, K', being provided in the vertical flange of the transverse bar so that the loops, K, may be adjusted just back of the wheels W and over the track of the planter.

Pivoted by suitable bolts L', upon each side of the loops, are substantially triangular soil plates, L, the forward edges of which are provided with a series of holes, L², by means of which the forward lower corners of the soil plates may be adjusted to engage a greater or less amount of earth through the instrumentality of bolts, L³, passing through the desired holes, L², and into holes provided near the base of the loops, K.

The rear of the loops, K, function to break up, to some extent, any lumps of earth ridged up by the soil plates, but this action may be increased, if desired, by lengths of chain, M, secured to the sides of the loops, K, so as to drag rearwardly thereafter. A lifting rope cable or chain, N, is attached at one end to the cross bar, G, and its opposite end is secured to the operator's seat V or other part, within ready reach of the operator, so that the frame, F and G, may be raised from the ground whenever desired.

It will be understood that the particular structure herein disclosed may be modified or changed without departing from the principles involved, and we desire to state that such obvious changes as may be made are contemplated within the scope of the appended claims.

What we claim as new is:—

1. An attachment for planters comprising a frame adapted to be pivoted to the bed of a planter and consisting of longitudinal side bars, a transverse bar adjustably secured to the rear ends of said side bars, rearwardly extending loops adjustably secured to said transverse bar, soil plates pivotally secured to each side of each loop, and means for adjustably securing said soil plates to their respective supports.

2. An attachment for planters comprising a substantially U-shaped frame pivotally secured to the bed of the planter, and soil plates adjustably secured to said U-shaped frame.

3. An attachment for planters comprising a suitable frame pivotally carried by the planter, and including a transverse rear member, brackets carried by said rear member, and soil plates adjustably secured to said brackets.

4. An attachment for planters comprising a suitable frame pivotally carried by the planter and including a transverse rear member, substantially V-shaped brackets on said rear member, and a soil plate adjustably mounted on each arm of each braket.

5. An attachment for planters comprising a suitable frame pivotally carried by the planter and including a transverse rear member, substantially V-shaped brackets on said rear member, and substantially triangular soil plates mounted on the arms of said brackets and having one angular corner pivotally secured thereto.

6. An attachment for planters comprising a suitable frame pivotally carried by the planter and including a transverse rear member, substantially V-shaped brackets on said rear member, and soil plates mounted on the arms of said brackets, each consisting of a triangular plate pivoted at one corner to its respective bracket and the edges of said plates farthest from said pivot being provided with apertures whereby adjustments of the plates are secured.

7. An attachment for planters comprising a substantially U-shaped frame pivotally secured to the bed of the planter, soil plates adjustably secured to said U-shaped frame, and drag chains looped rearwardly of said soil plates.

8. An attachment for planters comprising a suitable frame pivotally carried by the planter and including a transverse rear member, substantially V-shaped brackets on said rear member, soil plates mounted on the arms of said brackets, each consisting of a triangular plate pivoted at one corner to its respective bracket and the edges of said plates farthest from said pivot being provided with apertures whereby adjustments of the plates are secured, and drag chains looped rearwardly of said soil plates.

Signed at Kewanee, county of Henry, and State of Illinois, this 4th day of June, 1918.

JOHN E. STEVENS.
WILLIAM THACKERAY, Jr.

Witnesses:
  Geo. Jas. Jelinek,
  F. A. Dickinson.

Copies of this patent may be obtained for five cents each, by addressing the "Commissioner of Patents, Washington, D. C."